Patented July 21, 1953

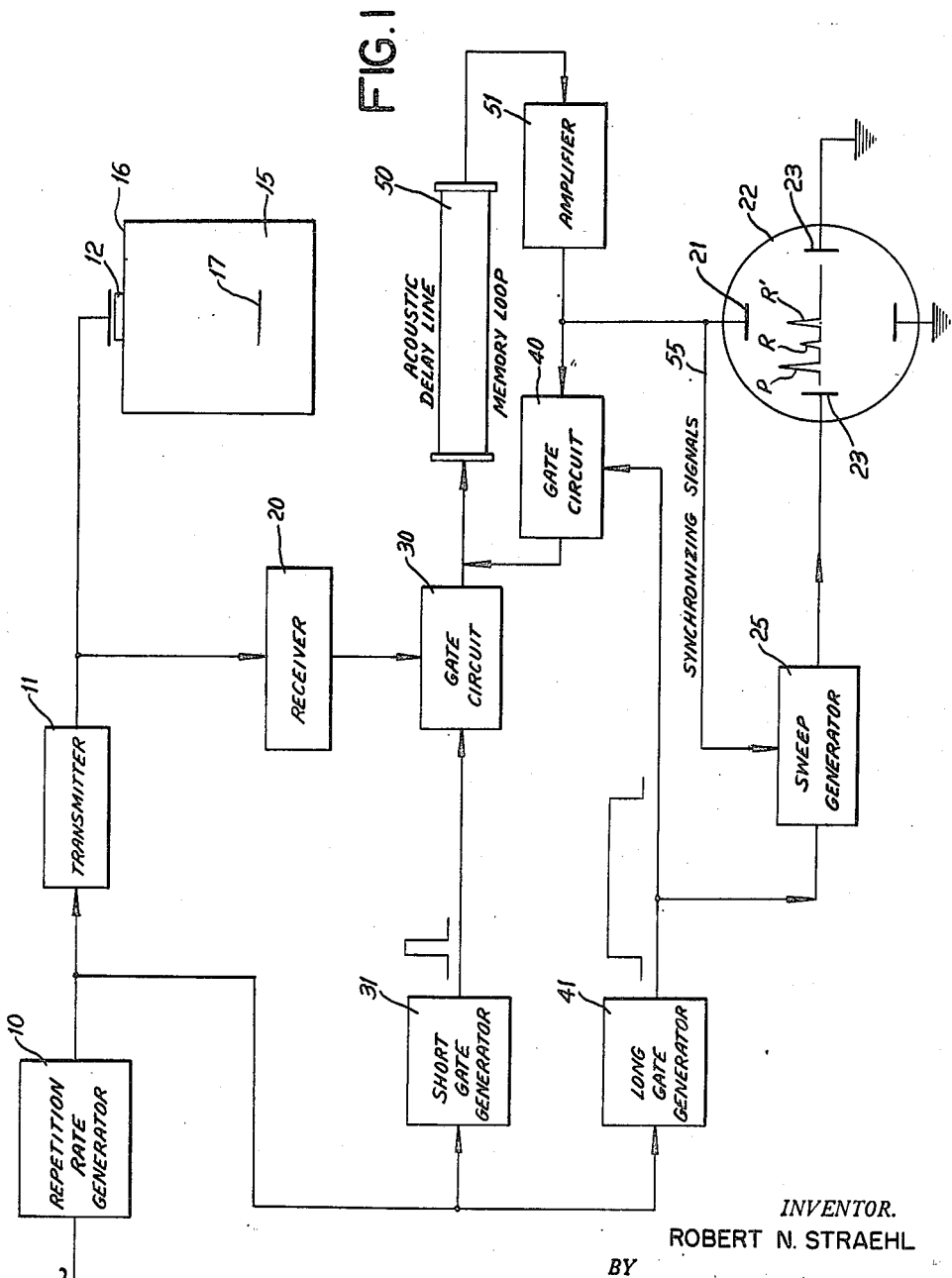

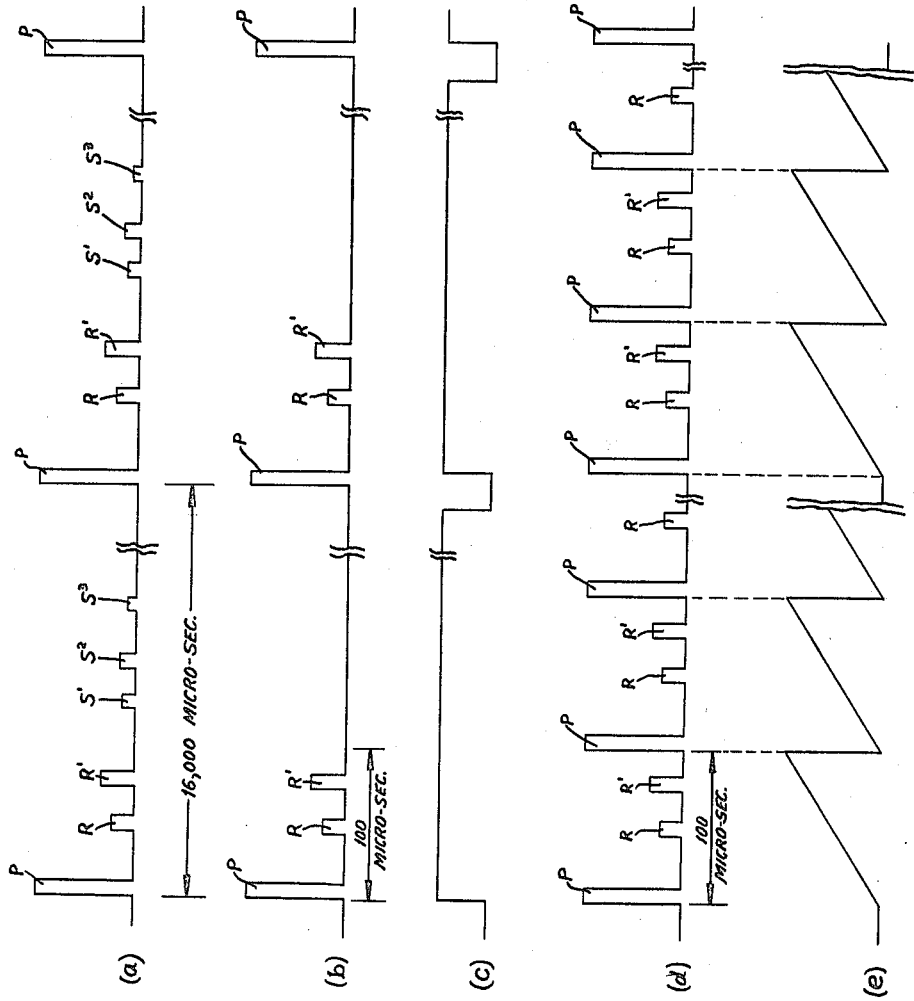

2,646,555

UNITED STATES PATENT OFFICE 2,646,555

MEANS FOR INCREASING THE BRIGHTNESS OF A CATHODE TUBE DISPLAY

Robert N. Straehl, Danbury, Conn., assignor to Sperry Products, Inc., Danbury, Conn., a corporation of New York Application August 3, 1950, Serial No. 177,357

1 Claim. (Cl. 340—16)

This invention relates to ultrasonic instruments employing a cathode ray tube, and has for its principal object the provision of a method and means for increasing the brightness of the cathode tube display. More particularly, the invention relates to the type of ultrasonic testing or inspection instrument in which pulses are periodically transmitted into objects such as metal blocks and the time interval which elapses between the transmission of the pulse and the reception of the first reflection of the pulse is indicated on the cathode tube sweep. The sweep is necessarily of short duration because of the small time intervals which are to be measured, and the repetition rate of transmission of the pulse (and, hence, of the sweep which is synchronized with the pulse) must be kept low to allow sufficient time for unwanted reflections from distant points to die out. The short time sweep and low repetition rate yield a cathode tube display of less than the desired brightness.

It is therefore the principal object of this invention to provide a method and means for increasing the brightness of the cathode ray tube display under the above stated operating conditions, i. e., of fast sweep and low repetition rate.

Further objects and advantages will become apparent in the following detailed description thereof.

In the accompanying drawings,

Fig. 1 is an electrical block diagram embodying my invention.

Fig. 2 is a series of graphs illustrating the theory of the invention.

Referring to Fig. 2 there is disclosed the theory of this invention which, for purposes of illustration, is shown as applied to an ultrasonic system in which a pulse P is repeated at a rate of 60 per second, in other words, a pulse is propagated approximately every 16,000 microseconds. The useful reflections R, R' of the pulse may occur within the first 100 microseconds, and it is necessary to render the receiver unresponsive to further signals such as $S^1$, $S^2$, $S^3$, because these are beyond the range in which we are interested. Ordinarily, therefore, there would be a period of 15,900 microseconds of inactivity of the cathode ray indicator until the next repetition of the pulse. By this invention I utilize this dead or inactive interval to obtain a multiplicity of repetitions of the desired indications R, R' on the cathode ray screen, thus greatly multiplying and intensifying the desired indications.

The means whereby I accomplish the above result is disclosed in Fig. 1 wherein a trigger or repetition rate generator 10 energized from a suitable source such as 60 cycle A. C. actuates a pulse generator or transmitter 11 60 times per second. The pulse is applied to a quartz crystal 12 which transforms the electrical vibrations into mechanical vibrations which are transmitted into a work-piece 15 which is to be inspected. The pulse enters through surface 16 and will be reflected from any reflecting surface therein such as defect 17. Both the transmitted pulse and reflections thereof are received by a receiver 20 whose output is applied (through intermediate devices to be described hereinafter) to the vertical plates 21 of a cathode ray oscilloscope 22 to deflect a horizontal sweep between horizontal plates 23. The sweep is generated by a sweep generator 25 synchronized with the pulse.

As stated in the introduction hereto, the echoes occurring in a relatively small time interval, for example, 100 microseconds corresponding to travel of the pulse through 1 ft. of aluminum, may be of interest, whereas indications received thereafter and until the next repetition of the pulse are of no interest to the operator. In the example chosen, the time interval which does not contain desired information is on the order of 15,900 microseconds. In order to limit reception to the desired time interval (in the example given, 100 microseconds) there is energized a coincidence gate circuit 30 of the type which is effective only when two inputs are applied, the gate 30 being energized by the output of receiver 20 in response to the generated pulse P and by a gating pulse 100 microseconds wide generated by a short gate generator which may be a multivibrator 31 energized from the repetition rate generator 10. Thus, upon each generation of pulse P, gate 30 will pass output from receiver 20 for the desired time interval (in this case, 100 microseconds).

If the pulse repetition rate is 60 times per second, there will be a relatively long interval (in this case, 15,900 microseconds) before the next pulse is transmitted. I utilize this time interval to secure repetition of the desired indications on the cathode ray tube. For this purpose, the repetition rate generator renders effective a long gate generator 41 at the same time that short gate generator 31 is rendered effective. In the example chosen, if the gating pulse generated by gate 31 is 100 microseconds wide, the gating pulse generated by gate 41 will be just short of 16,000 microseconds, such as, for example, 15,900 microseconds. The pulse generated by gate 41 permits operation of the free-running sweep generator 25 which can thus be set to repeat the sweep each 100 microseconds (see Fig. 2e). At the same time, the generation of the long gate is applied to coincidence gate circuit 40 whose other source of energization is a memory circuit energized from the output of short-period gate 30. Thus, once gate circuit 30 allows signals to pass for the desired short period (in this example, 100 microseconds), futher reception of signals is cut off (see Fig. 2a). The signal output from gate 30 will, however, be repeated by the memory circuit which includes long-period gate 40 (see Fig. 2c) as long as said gate is effective (in this example, for 15,900 microseconds). In other words, instead of signal voltages R, R' being indicated once every 16,000 microseconds on the cathode ray tube, these indications will appear 159 times in the same time interval between pulses (see Fig. 2d).

The memory loop may comprise any suitable acoustic delay line 50 to one end of which the output of receiver 20 may be applied for the interval that gate 30 is effective, and the other end of which is connected to an amplifier 51 whose output is applied to the vertical plates 21 of the cathode ray tube and to gate 40 which will return it to the input of the delay line. Thus, for as long as gate 40 is effective (in this example, 15,900 microseconds), the signal voltages passed by the short period gate 30 will be circulated through the memory loop, the output at each circuit being applied to the vertical plates of the cathode ray tube. A portion of the voltage output from amplifier 51 may be diverted to sweep generator 25 by lead 55 to synchronize the sweep with output of amplifier 51 and thus insure coincidence of the repetitions of R, R' on the sweep.

The usual acoustic delay line is a tube filled with mercury, a block of magnesium or other known materials having piezo-electric elements at each end.

Having described my invention, what I claim and desire to secure by Letters Patent is:

In a device of the type described, means for transmitting successive ultrasonic pulses into an object at relatively long time intervals between pulses, means for receiving reflections of each transmitted pulse, means for rendering the receiving means ineffective a relatively short time interval after the transmission of each pulse, a memory loop circuit including a time delay mechanism for introducing a delay at least equal to the length of time that said receiving means is effective, means for discharging the output of said receiver into the memory circuit whereby said output will be repeated as long as said loop circuit is effective, and means for indicating the signal voltages passing through said circuit, said last-named means comprising a cathode ray tube having vertical and horizontal plates, a free-running sweep circuit for establishing a sweep between the horizontal plates, means for rendering the sweep circuit effective in synchronism with the transmission of each pulse, means for synchronizing the sweep with the signal voltages passing through said memory circuit, the voltages in said memory circuit being applied to the vertical plates, and means for rendering the memory circuit ineffective after a predetermined time interval and before the transmission of the succeeding pulse.

ROBERT N. STRAEHL.

References Cited in the file of this patent:

UNITED STATES PATENTS

| Number | Name | Date |
|---|---|---|
| 2,370,134 | Begun | Feb. 27, 1945 |
| 2,378,383 | Arndt | June 19, 1945 |
| 2,378,388 | Begun | June 19, 1945 |
| 2,415,119 | Wellenstein | Feb. 4, 1947 |

OTHER REFERENCES

An article entitled Mercury Delay Line Memory Using a Pulse Rate of Several Megacycles in the August 1949 issue of the "Proceedings of the I. R. E.," copy in Division 23, 235–61.